(12) United States Patent
Crespi et al.

(10) Patent No.: US 8,591,639 B2
(45) Date of Patent: Nov. 26, 2013

(54) CERAMIC INKS AND VEHICLES

(75) Inventors: Stefano Crespi, Busto Arsizio (IT); Alan Nappa, Modena (IT); Paolo Prampolini, Castelnuovo Rangone (IT); Giuseppe Li Bassi, Gavirate (IT)

(73) Assignee: Lamberti SpA, Albizzate (VA) (IT)

( * ) Notice: Subject to any disclaimer, the term of this patent is extended or adjusted under 35 U.S.C. 154(b) by 283 days.

(21) Appl. No.: 12/997,438

(22) PCT Filed: Jun. 8, 2009

(86) PCT No.: PCT/EP2009/057048
§ 371 (c)(1),
(2), (4) Date: Dec. 10, 2010

(87) PCT Pub. No.: WO2009/150132
PCT Pub. Date: Dec. 17, 2009

(65) Prior Publication Data
US 2011/0088581 A1 Apr. 21, 2011

(30) Foreign Application Priority Data
Jun. 10, 2008 (IT) .................... VA2008A000032

(51) Int. Cl.
*C09D 11/02* (2006.01)
*B05D 3/02* (2006.01)

(52) U.S. Cl.
USPC .................. 106/31.05; 106/31.75; 106/31.86; 106/31.9; 106/311; 427/384

(58) Field of Classification Search
USPC .............. 106/31.05, 31.75, 31.86, 31.9, 311; 427/384
See application file for complete search history.

(56) References Cited

U.S. PATENT DOCUMENTS

| | | | | |
|---|---|---|---|---|
| 2,617,740 A * | 11/1952 | Morris | ................... | 106/311 |
| 2,748,093 A * | 5/1956 | Morris | ................... | 523/170 |
| 5,326,390 A * | 7/1994 | Tecle | ................... | 106/205.6 |
| 5,580,373 A * | 12/1996 | Lane et al. | ................... | 524/100 |
| 5,582,636 A * | 12/1996 | Schiraldi et al. | ........... | 106/194.2 |
| 5,693,126 A * | 12/1997 | Ito | ................... | 106/31.75 |
| 7,267,716 B2 * | 9/2007 | Nagashima et al. | ....... | 106/31.75 |
| 7,396,398 B2 * | 7/2008 | Lee et al. | ................... | 106/31.75 |
| 8,133,314 B2 * | 3/2012 | Ishihara et al. | ............ | 106/31.86 |
| 2007/0040881 A1 * | 2/2007 | Ham et al. | ................. | 106/31.75 |
| 2009/0308646 A1 * | 12/2009 | Toyoda | ................... | 106/31.92 |
| 2011/0303118 A1 * | 12/2011 | Kim et al. | ................. | 106/31.13 |
| 2012/0315401 A1 * | 12/2012 | Prampolini et al. | ......... | 106/31.6 |

FOREIGN PATENT DOCUMENTS

| WO | WO 2006/134063 A2 * | 12/2006 |
|---|---|---|
| WO | WO 2008/084042 A1 * | 7/2008 |
| WO | WO 2011/104216 A1 * | 9/2011 |

* cited by examiner

*Primary Examiner* — Helene Klemanski
(74) *Attorney, Agent, or Firm* — Mossman, Kumar & Tyler PC

(57) ABSTRACT

Ceramic inks comprising ceramic pigments dispersed in vehicles based on water and glycols and containing urea, and method for decorating green or fired ceramic bodies by the use of said inks.

14 Claims, No Drawings

CERAMIC INKS AND VEHICLES

FIELD OF THE INVENTION

The present invention relates to vehicles for ceramic pigments, to ceramic inks and to a method for decorating green or fired ceramic bodies by the use of said inks.

The ceramic inks of the invention mainly consist of ceramic pigments dispersed in vehicles based on water and glycols and containing urea.

BACKGROUND OF THE ART

Vehicles for ceramic pigments (ceramic mediums) are fluids that are used in the preparation of ceramic inks to disperse ceramic pigments, to regulate their viscosity, flowing properties, and binding-cohesive behaviour.

Most traditional ceramic manufactured products, such as wall tiles and floor tiles, are made of a ceramic body that confers form and mechanical properties to the object; the ceramic body generally has some porosity and poor aesthetic qualities.

Said ceramic body, which is defined "green" or, alternatively, "fired", if previously fired, is then usually coated with ceramic layer, called ceramic glaze; the ceramic glaze is completely sintered by firing, in such a way to gain suitable superficial aesthetic qualities and, in the meantime, to become a fluid-proof barrier; as a matter of fact, after firing, the ceramic glaze has usually zero porosity and is generally resistant to abrasion and to the attack of chemical agents such as acids, bases, dyes.

The aesthetic finishing of the ceramic material can be completed by a decoration phase, that is by the application of sinterable and variously coloured ceramic materials (ceramic pigments) which are applied according to a precise drawing (décor).

The decor can be applied either on the green or fired ceramic body, on which the glaze was previously set, or, in the so called third firing decorations, after the firing on the glaze.

The ceramic vehicle of the invention is suitable for the décor of green or fired ceramic bodies on which the glaze was previously set.

The main printing techniques used in the decoration either of green or fired ceramic substrate are flat screen printing, rotary screen printing and the decoration by silicone roller (the latter comprising the printing through laser engraved roller, or "rotogravure printing", and the printing through relief engraved roller, or "silicone stamp printing"); the decoration by silicon roller is also called rotogravure.

All these decoration techniques require a series of overlapping printings, one for each of the colours that compose the drawing. Ceramic inks and vehicles are formulated according to the kind of ceramic body to which they will be applied (green ceramic, fired ceramic, sintered glaze, glass, paper . . . ) and according to the application technique (brush, spatula, screen printing, rotogravure printing . . . ).

In the preparation of ceramic inks for the screen printing or rotogravure decorations of green or fired ceramic bodies, vehicles based on mixtures of water and glycols and normally containing additives, such as rheology modifiers, binders and plasticizers, are generally used.

It is important for the final user that the vehicle is stable, provides stable ceramic inks and décors having good definition.

Vehicles based on water and glycols do possess these requisites, but suffer from some drawbacks too.

In particular, some of the most frequently used glycols, ethylene glycol and diethylene glycol, are labelled as harmful substances.

Furthermore, glycols are industrial products deriving from mineral oil and it is well known that the world oil supply is limited and the price of glycols is subject to wide fluctuations that in the latest years are averagely directed to a strong rise.

Therefore, it would be advantageous to reduce the amount of glycols in the ceramic vehicles without adversely affecting the stability of the ceramic inks and their performance.

DESCRIPTION OF THE INVENTION

It has now been found that ceramic vehicles based on water and glycols that contain up to 40% by weight of urea provide inks that allow the realisation of decors having comparable or improved definition with respect to inks obtained using analogue vehicles in which urea is replaced by the same percentage in weight of glycols; moreover, the ceramic inks comprising the ceramic vehicles of the present invention show a drying time which is adequate to the above mentioned decoration techniques.

Urea is a low cost non noxious industrial product that is largely used in agriculture and even in personal care products, such as soaps, dentifrices, detergents.

Urea is known as a water retaining agent and is used as such in the field of textile printing; it is also cited as humectant for aqueous based ink jet printing inks.

In the ceramic field, U.S. Pat. No. 2,617,740 and U.S. Pat. No. 2,748,093 describe solid non aqueous compositions containing small percentages of urea that are used for screen printing at a temperature well above the room temperature.

Again in the ceramic field, BR PI0503487 discloses a powdery composition essentially consisting of a sort of a flux, binder, thickener, and smoothening agent, which is described as a chemical compound based on nonionic surfactant agents, antifoamers, preservatives, and urea; nothing is said about the amount of urea used, or about the advantages connected with its use.

As far as the Applicant knows, urea has not been described in the literature as a substance that can effectively replace a remarkable portion of glycols in ceramic vehicles based on water and glycols.

DETAILED DESCRIPTION

It is therefore a fundamental object of the present invention a vehicle for ceramic pigments comprising:
  a. from 5 to 50% by weight (wt), and preferably from 10 to 40% wt, of urea;
  b. from 20 to 50% wt, and preferably from 30 to 50% wt, of water;
  c. from 0 to 60% wt, and preferably from 10 to 40% wt, of one or more glycols.

It is a further object of the present invention a ceramic ink useful for the screen printing decoration of green or fired ceramic bodies consisting of from 30 to 70 parts by weight of ceramic pigments and from 70 to 30 parts of a ceramic vehicle comprising:
  a. from 5 to 50% by weight, and preferably from 10 to 40% wt, of urea;
  b. from 20 to 50% wt, and preferably from 30 to 50% wt, of water;
  c. from 0 to 60% wt, and preferably from 10 to 40% wt, of one or more glycols.

According to a further aspect, the invention is a method for decorating green or fired ceramic bodies, comprising the following steps:

i. a ceramic ink consisting of from 30 to 70% by weight of ceramic pigments and from 70 to 30% by weight of a ceramic vehicle comprising:
   a. from 5 to 50% by weight, and preferably from 10 to 40% wt, of urea;
   b. from 20 to 50% wt, and preferably from 30 to 50% wt, of water;
   c. from 0 to 60% wt, and preferably from 10 to 40% wt, of one or more glycols, is prepared.
ii. a glaze is spread on the surface of the green or fired ceramic body;
iii. the decoration is made by means of flat screen printing, or rotary screen printing, or rotogravure, by using one or more of the inks according to point i;
iv. the obtained substrate is fired at a temperature comprised between 900 and 1250° C. for 15-240 minutes.

Experimentally, it has been determined that the use of ceramic vehicles containing urea also reduces the nitrogen oxides ($NO_x$) emissions during the firing of the ceramic body (as it is well known, nitrogen oxides are among the main pollutants deriving from combustion processes).

This phenomenon represent a further significant advantage of the present invention.

The NOx reduction is probably caused by the fact that, at temperature above 300° C., urea reacts with the aqueous vapor giving ammonia and $CO_2$, and that ammonia in turn, in the presence of atmospheric oxygen can transform the nitrogen oxides into $N_2$ and water.

The glycols of the vehicles of the invention are water-soluble glycols which are liquid at normal temperature and pressure conditions. Preferably they are selected among monopropylene glycol (MPG), dipropylene glycol (DPG), monoethylene glycol (MEG), diethylene glycol (DEG), glycerine and polyethylene glycol having molecular weight below 500 daltons (PEG).

The vehicles of the present invention are fluids with a homogeneous aspect and a viscosity measured by means of a Haake rheometer between 0.1 and 1,000 sec$^{-1}$ comprised between 30 and 1000 mPa*s. The viscosity of the vehicle is chosen according to the type of printing technique selected for the decoration.

Vehicles having low viscosity (30-100 mPa*s) and newtonian or lightly pseudoplastic behaviour are used when a rotogravure printing ceramic ink is to be prepared; vehicles having higher viscosity (100-1,000 mPa*s) and more pseudoplastic behaviour are used when a ceramic ink for flat or rotary screen printing is to be prepared. Viscosity and pseudoplasticity are regulated, according to what is well known to those skilled in the art, by adding to the ceramic vehicle a rheology modifier.

The ceramic vehicle of the invention normally comprises from 0.10 to 10% by weight of a rheology modifier; preferred rheology modifiers are modified natural polymers, such as hydroxyethyl cellulose and hydroxypropyl guar, and synthetic polymers such as polyacrylic thickeners.

For the realisation of the present invention it is also possible to use mixtures of rheology modifiers having different thickening properties and different rheological behaviour.

The preparation of the vehicle according the invention can be performed following the usual techniques, that is by preparing the glycol/water mixture, adding gradually urea and the rheology modifier under stirring, adding a base to develop the viscosity, if needed, and completing the preparation with the addition of the additives normally utilised for the preparation of vehicles for ceramic pigments; the vehicles of the present invention can actually contain up to 10% by weight of one or more additives among those commonly used, such as preservatives, biocides, antifoams, dispersants, binders, levelling agents, and so forth.

According to a particularly advantageous aspect, the preparation of the vehicle can be done at room temperature.

Also the décor by silk printing technique is advantageously performed at room temperature.

The ceramic pigments useful in the ceramic inks of the invention are solid sinterable materials, that means that they are transformed in ceramic during the firing process; these are oxides, pigments, frits, glasses and other ceramic materials; they are in the form of solid particles having dimensions varying from 0.5 to 100 microns.

Typically, they include iron, titanium, chromium, zinc, magnesium, aluminium, cobalt, and cadmium oxides, and zirconium and praseodymium silicates.

The average viscosity of the inks, measured with a Haake rheometer between 0.1 and 200 s$^{-1}$ is between 50 and 2,000 mPa*s.

EXAMPLES

All the viscosities reported in the present text were measured with a rotational rheometer; the viscosity measures were performed through flow curves at "controlled shear rate" between the specified intervals.

Example 1

Vehicles Preparation 12 vehicles for ceramic pigments were prepared (Vehicles A1-A4, B1-B4, C1-C4).

The vehicles with the same letter (by way of example A1-A4) are analogous vehicles in which increasing portions of glycol are substituted with urea.

The vehicles have been prepared by firstly preparing the water/glycol/urea and additives mixture, and, when specified, dispersing the thickening agent into it and building up the viscosity through the addition of the base.

The basic compositions of the vehicles are reported in Table 1, where the ingredients and their dosage are indicated (% wt).

TABLE 1

| Vehicle | Water | DEG | MEG | DPG | Urea | MR[1] | Base[4] | Add.[2] |
|---|---|---|---|---|---|---|---|---|
| A1[3] | to 100 | — | 30 | 40 | — | — | — | 0.1 |
| A2 | to 100 | — | 20 | 40 | 10 | — | — | 0.1 |
| A3 | to 100 | — | 10 | 40 | 20 | — | — | 0.1 |
| A4 | to 100 | — | — | 40 | 30 | — | — | 0.1 |
| B1[3] | to 100 | — | 50 | — | — | 3.2 | 0.55 | 1.0 |
| B2 | to 100 | — | 40 | — | 10 | 3.2 | 0.55 | 1.0 |
| B3 | to 100 | — | 30 | — | 20 | 3.3 | 0.65 | 1.0 |
| B4 | to 100 | — | 10 | — | 40 | 3.5 | 0.70 | 1.0 |
| C1[3] | to 100 | 40 | — | — | — | 8.0 | 1.5 | 4.0 |
| C2 | to 100 | 30 | — | — | 10 | 8.0 | 1.5 | 4.0 |
| C3 | to 100 | 20 | — | — | 20 | 8.2 | 1.7 | 4.0 |
| C4 | to 100 | — | — | — | 40 | 8.5 | 2.0 | 4.0 |

[1] rheology modifier (acrylic thickener)
[2] other additives (preservative and anti-foam agent)
[3] comparative vehicle
[4] 30% NaOH The viscosity of the vehicles between 0.1 and 500 sec$^{-1}$ at 30° C. is reported in Table 1a, along with their stability 1 week after their preparation.

TABLE 1a

| Vehicle | Viscosity (mPa * s) | Stability |
|---|---|---|
| A1[3] | 150 | Good |
| A2 | 126 | Good |
| A3 | 130 | Good |
| A4 | 135 | Good |
| B1[3] | 110 | Good |
| B2 | 100 | Good |
| B3 | 97 | Good |
| B4 | 106 | Good |
| C1[3] | 800 | Good |
| C2 | 750 | Good |
| C3 | 740 | Good |
| C4 | 801 | Good |

[3] Comparative vehicle

Example 2

Preparation of the Ceramic Inks and Ceramic Decorations 12 ceramic inks were prepared by mixing, using a mill, each of the 12 vehicles prepared in Example 1 with a frit (Colorobbia TTB), in the proportion by weight indicated in Table 2 (the ink PA1 is prepared from the vehicle A1, the ink PA2 from vehicle A2, and so on).

TABLE 2

| Inks | Vehicles | Parts by weight of vehicle | Parts by weight of frit |
|---|---|---|---|
| PA1-PA4 | A1-A4 | 100 | 70 |
| PB1-PB4 | B1-B4 | 100 | 120 |
| PC1-PC4 | C1-C4 | 100 | 80 |

The stability and viscosity of the thus prepared inks are reported in Table 3.

The viscosity (Vp) is the average viscosity in mPa*s measured using a Haake rheometer through a flow curve between 0.1 and 200 sec$^{-1}$ at 25° C. A ink is considered "stable" if it does not present separation phenomena or lumps formation when stored at room temperature for 72 hour after its preparation.

The stable inks are indicated in Table 3 using the symbol +, the non-stable inks with the symbol −.

Inks PA1-A4 and PC1-PC4 were applied through flat silk-screen printing on the ceramic body; inks PB1-PB4 were applied through rotogravure printing on the same support.

Afterwards, the drying time of the thus obtained decor (Drying t) and, visually after drying, the definition quality of the decor itself (D) were determined.

The results are reported in Table 3.

TABLE 3

| Ink | Vp | Stability | Drying † | D |
|---|---|---|---|---|
| PA1* | 800 | + | 17" | Good |
| PA2 | 750 | + | 15" | Good |
| PA3 | 730 | + | 15" | Good |
| PA4 | 720 | + | 14" | Good |
| PB1* | 118 | + | 7'22" | Good |
| PB2 | 112 | + | 4'18" | Good |
| PB3 | 115 | + | 5'18" | Good |
| PB4 | 104 | + | 7'22" | Good |
| PC1* | 1350 | + | 35" | Good |
| PC2 | 1200 | + | 30" | Good |
| PC3 | 1280 | + | 32" | Good |
| PC4 | 1360 | + | 38" | Good |

*comparative

The results show that all the vehicles, prepared with increasing percentages of urea have good rheological behaviour, stability and appearance and perform well.

The invention claimed is:

1. A ceramic ink consisting of from 30 to 70% by weight of ceramic pigments and from 70 to 30% by weight of a ceramic vehicle comprising:
   a. from 5 to 50% by weight of urea;
   b. from 20 to 50% by weight of water; and
   c. from 0 to 60% by weight of one or more glycols.

2. The ceramic ink according to claim 1 wherein the vehicle comprises:
   a. from 10 to 40% by weight of urea;
   b. from 30 to 50% by weight of water; and
   c. from 10 to 40% by weight of one or more glycols.

3. The ceramic ink according to claim 2 wherein the vehicle comprises up to 10% by weight of one or more additives selected from the group consisting of preservatives, biocides, antifoams, dispersants, binders and leveling agents.

4. The ceramic ink according to claim 3-wherein the vehicle consists of:
   a. from 10 to 40% by weight of urea;
   b. from 30 to 50% by weight of water;
   c. from 10 to 40% by weight of one or more glycols; and
   d. from 0 to 10% by weight of one or more additives selected from the group consisting of preservatives, biocides, antifoams, dispersants, binders and leveling agents.

5. The ceramic ink according to claim 3 wherein the vehicle comprises from 0.1 to 10% by weight of one or more rheology modifiers.

6. The ceramic ink according to claim 5-wherein the vehicle consists of:
   a. from 10 to 40% by weight of urea;
   b. from 30 to 50% by weight of water;
   c. from 10 to 40% by weight of one or more glycols;
   d. from 0 to 10% by weight of one or more additives selected from the group consisting of preservatives, biocides, antifoams, dispersants, binders and levelling agents; and
   e. from 0.1 to 10% by weight of one or more rheology modifiers.

7. A method for decorating green or fired ceramic bodies, comprising the following steps:
   i. a ceramic ink according to claim 1 is prepared;
   ii. a glaze is spread on the surface of the green or fired ceramic body;
   iii. the decoration is made by means of flat screen printing, or rotary screen printing, or rotogravure, by using one or more inks according to point i; and
   iv. the obtained substrate is fired at a temperature comprised between 900 and 1250° C. for 15-240 minutes.

8. A vehicle for ceramic pigments comprising:
   a. from 5 to 50% by weight of urea;
   b. from 20 to 50% by weight of water; and
   c. from 0 to 60% by weight of one or more glycols;
   wherein the vehicle for ceramic pigments has a Haake-viscosity from 30 to 1,000 mPa*s from 0.1 to 1,000 s$^{-1}$ at 25° C.

9. The vehicle for ceramic pigments according to claim 8-comprising:
   a. from 10 to 40% by weight of urea;
   b. from 30 to 50% by weight of water; and
   c. from 10 to 40% by weight of one or more glycols.

10. The vehicle for ceramic pigments according to claim 9 comprising up to 10% by weight of one or more additives selected from the group consisting of preservatives, biocides, antifoams, dispersants, binders and leveling agents.

11. The vehicle for ceramic pigments according to claim 10 consisting of:
   a. from 10 to 40% by weight of urea;
   b. from 30 to 50% by weight of water;
   c. from 10 to 40% by weight of one or more glycols; and
   d. from 0 to 10% by weight of one or more additives selected from the group consisting of preservatives, biocides, antifoams, dispersants, binders and leveling agents.

12. The vehicle for ceramic pigments according to claim 10 comprising from 0.1 to 10% by weight of one or more rheology modifiers.

13. The vehicle for ceramic pigments according to claim 11 consisting of:
   a. from 10 to 40% by weight of urea;
   b. from 30 to 50% by weight of water;
   c. from 10 to 40% by weight of one or more glycols;
   d. from 0 to 10% by weight of one or more additives selected from the group consisting of preservatives, biocides, antifoams, dispersants, binders and levelling agents; and
   e. from 0.1 to 10% by weight of one or more rheology modifiers.

14. The vehicle for ceramic pigments according to claim 8 wherein the rheology modifier is hydroxyethyl cellulose, hydroxypropyl guar or a polyacrylic thickener.

* * * * *